United States Patent [19]
Akashi

[11] Patent Number: 5,570,331
[45] Date of Patent: Oct. 29, 1996

[54] METHOD OF AND APPARATUS FOR DETECTING END OF REPRODUCTION OF MAIN DATA RECORDED ON INFORMATION RECORD MEDIUM, AND SYSTEM FOR REPRODUCING INFORMATION RECORD MEDIUM

[75] Inventor: Nobuhiko Akashi, Tokorozawa, Japan

[73] Assignee: Pioneer Electronic Corporation, Tokyo, Japan

[21] Appl. No.: 538,030

[22] Filed: Oct. 2, 1995

[30] Foreign Application Priority Data

Jun. 10, 1994 [JP] Japan ................................. 6-243216

[51] Int. Cl.⁶ ...................................................... G11B 7/00
[52] U.S. Cl. ................................... 369/47; 369/58; 369/48
[58] Field of Search ................................. 369/47, 48, 58, 369/59, 32, 33, 53, 54, 84; 360/48

[56] References Cited

U.S. PATENT DOCUMENTS

| | | | |
|---|---|---|---|
| 5,295,123 | 3/1994 | Seri et al. | 369/48 X |
| 5,392,265 | 2/1995 | Takezawa | 369/47 x |
| 5,420,843 | 5/1995 | Yoshida | 369/58 |
| 5,471,441 | 11/1995 | Nonaka et al. | 369/47 X |

*Primary Examiner*—Thang V. Tran
*Attorney, Agent, or Firm*—Nixon & Vanderhye

[57] ABSTRACT

An end of a reproduction of each piece of main data recorded on an information record medium is detected, on which each piece of sub code data corresponding to each piece of main data is also recorded to indicate information for controlling the reproduction of each piece of main data, in a reproducing system which reads the main data and the sub code data on the basis of a predetermined clock. The sub code data include a first data portion, which value changes when the reproduction of each piece of main data is ended, and a second data portion, which value changes in correspondence with a content of the main data and has a predetermined relationship with a value of the first data portion. The method is provided with the steps of: detecting a change in the value of the first data portion during the reproduction of each piece of main data; detecting a current value of the second data portion when the change is detected; judging whether or not the detected current value of the second data portion is equal to a predetermined value of the second data portion, which is supposed to be obtained when the first data portion is normally changed at the end of the reproduction of each piece of main data; and detecting the end of the reproduction of each piece of main data on the basis of a result of judgement in the judging step.

18 Claims, 12 Drawing Sheets

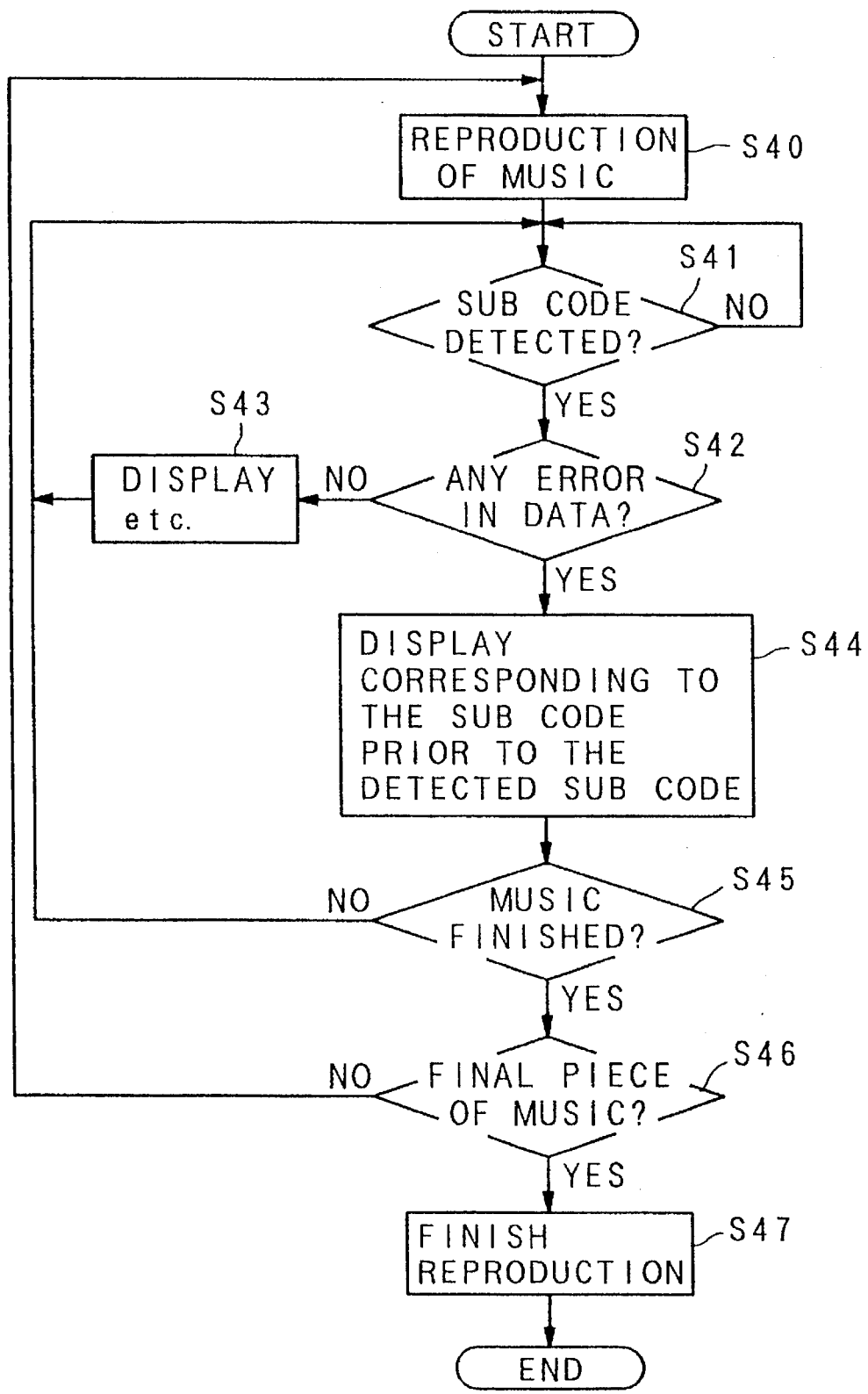

5,570,331

METHOD OF AND APPARATUS FOR DETECTING END OF REPRODUCTION OF MAIN DATA RECORDED ON INFORMATION RECORD MEDIUM, AND SYSTEM FOR REPRODUCING INFORMATION RECORD MEDIUM

BACKGROUND OF THE INVENTION

1. Field of the Invention

The present invention relates to a method of and an apparatus for detecting an end of a reproduction of main data such as music data, which are recorded on an information record medium such as a CD (Compact Disc), on the basis of sub code data, which are also recorded on the information record medium.

2. Description of the Related Art

A CD is recorded with main data such as music data and sub code data, which correspond to the main data and indicate information for controlling the reproduction of the main data such as track number information, music number information, index information, chapter number information, music title information, time information, absolute time information and so on. A CD player detects a beginning of the main data (e.g. the beginning of one piece of music) and an end of the main data (e.g. the end of one piece of music) in accordance with the content of the sub code data. Thus, the CD player can perform a special reproduction such as a random reproduction, a repeated reproduction and a programmed reproduction, such that the next piece of music is searched on the basis of the detection results. Here, in case that a plurality of various pieces of music are recorded on the CD, the main data correspond to each piece of music. In case that a plurality of movements of one piece of music are recorded on the CD, the main data correspond to each movement of music.

The operation in the CD player to detect the sub code data is performed on the basis of a predetermined clock, which may be Generated by a clock Generator in the CD player or which may be Generated by the clock signal recorded on the CD.

However, an external or internal noise may be mixed into the clock of the CD player while the clock is transmitted through a clock transmission line. Especially, in such a reproducing system that a plurality of CD players are provided in one reproducing system and are controlled by a single controller, since the clock transmission line is relatively long, there is a high possibility that the noise is mixed into the clock. When the noise is mixed into the clock, the controller may fail to correctly read the sub code data. When this happens, the operation of the CD player to detect the beginning and the end of reproduction may not be correctly performed. For example, in the special reproduction by use of the sub code data, even if the reproduction is being conducted in the middle of main data, the reproduction may be suddenly stopped in the middle of the main data and the reproduction of the next main data may be suddenly started, since the end of reproduction of main data is erroneously detected on the basis of the erroneously detected sub code data, which is a serious problem in a practical sense.

SUMMARY OF THE INVENTION

It is therefore a first object of the present invention to provide a method of and an apparatus for detecting an end of a reproduction of each piece of main data recorded on an information record medium even if the detection of the sub code data is influenced by the noise. It is a second object of the present invention to provide a system for reproducing an information record medium which can correctly perform the special reproduction such as a random reproduction, a repeated reproduction and a programmed reproduction even if the detection of the sub code data is influenced by the noise.

The above mentioned first object of the present invention can be achieved by a method of detecting an end of a reproduction of each piece of main data recorded on an information record medium, on which each piece of sub code data corresponding to each piece of main data is also recorded to indicate information for controlling the reproduction of each piece of main data, in a reproducing system which reads the main data and the sub code data on the basis of a predetermined clock. The sub code data include a first data portion, which value changes when the reproduction of each piece of main data is ended, and a second data portion, which value changes in correspondence with a content of the main data and has a predetermined relationship with a value of the first data portion. The method is provided with the steps of: detecting a change in the value of the first data portion during the reproduction of each piece of main data; detecting a current value of the second data portion when the change is detected by the change detecting step; judging whether or not the detected current value of the second data portion is equal to a predetermined value of the second data portion, which is supposed to be obtained when the first data portion is normally changed at the end of the reproduction of each piece of main data; and detecting the end of the reproduction of each piece of main data on the basis of a result of judgement by the judging step.

In the operation by the method of the present invention, during the reproduction of each piece of main data in a reproducing system, a change in the value of the first data portion is detected. When the change is detected by the change detecting step, a current value of the second data portion is detected. Then, it is judged whether or not the detected current value of the second data portion is equal to a predetermined value of the second data portion, which is supposed to be obtained when the first data portion is normally changed at the end of the reproduction of each piece of main data. Then, the end of the reproduction of each piece of main data is finally detected on the basis of a result of judgement by the judging step.

Accordingly, if the first data portion of the sub code data is erroneously changed in the middle of the reproduction of one piece of main data due to the noise mixed into the clock, the current value of the second data portion is not judged to be equal to the predetermined value by the judging step. Thus, by detecting the end of the reproduction of each piece of main data on the basis of the judgement result by the judging step, it is possible to detect the end of reproduction of each piece of main data correctly even if the first data portion of the sub code data is erroneously changed due to the noise mixed into the clock, which is used for detecting the sub code data.

In one aspect of the method of the present invention, the method may be further provided with the step of storing the first data portion when the end of the reproduction of each piece of main data is detected by the end detecting step, wherein the stored first data portion is compared with a current value of the first data portion in the change detecting step to detect the change. Thus, the change in the current value of the first data can be efficiently and reliably detected on the basis of the clock. In this case, the method may be preferably further provided with the steps of: detecting whether or not the reproduced piece of main data is at a final position of the information record medium before the change detecting step; and finishing the reproduction if the reproduced piece of main data is detected to be at the final position. Thus, if the reproduction of the last piece of main data recorded on the information record medium, or the piece of main data instructed to be finally reproduced is finished, the reproduction of the information record medium can be certainly and reliably finished without performing unnecessary steps.

The above mentioned first object of the present invention can be also achieved by an apparatus for detecting an end of a reproduction of each piece of main data recorded on an information record medium, on which each piece of sub code data corresponding to each piece of main data is also recorded to indicate information for controlling the reproduction of each piece of main data, in a reproducing system which reads the main data and the sub code data on the basis of a predetermined clock. The sub code data include a first data portion, which value changes when the reproduction of each piece of main data is ended, and a second data portion, which value changes in correspondence with a content of the main data and has a predetermined relationship with a value of the first data portion. The apparatus is provided with: a change detection device for detecting a change in the value of the first data portion during the reproduction of each piece of main data; a current value detection device for detecting a current value of the second data portion when the change is detected by the change detection device; a judgement device for judging whether or not the detected current value of the second data portion is equal to a predetermined value of the second data portion, which is supposed to be obtained when the first data portion is normally changed at the end of the reproduction of each piece of main data; and an end detection device for detecting the end of the reproduction of each piece of main data on the basis of a result of judgement by the judgement device.

In the operation of the apparatus of the present invention, during the reproduction of each piece of main data in a reproducing system, a change in the value of the first data portion is detected by the change detection device. When the change is detected by the change detecting device, a current value of the second data portion is detected by the current value detection device. Then, it is judged whether or not the detected current value of the second data portion is equal to a predetermined value of the second data portion, which is supposed to be obtained when the first data portion is normally changed at the end of the reproduction of each piece of main data, by the judgement device. Then, the end of the reproduction of each piece of main data is finally detected by the end detection device, on the basis of a result of judgement by the judgement device.

Accordingly, it is possible to detect the end of reproduction of each piece of main data correctly even if the first data portion of the sub code data is erroneously changed due to the noise mixed into the clock in the same manner as the method of the present invention.

In one aspect of the apparatus of the present invention, the apparatus may be further provided with a storage device for storing the first data portion when the end of the reproduction of each piece of main data is detected by the end detection device, wherein the stored first data portion is compared with a current value of the first data portion by the change detection device to detect the change. Thus, the change in the current value of the first data can be efficiently and reliably detected on the basis of the clock by the change detection device. In this case, it is preferable that the end detection device further detects whether or not the reproduced piece of main data is at a final position of the information record medium, and that the reproducing system finishes the reproduction if the reproduced piece of main data is detected to be at the final position by the end detection device. Thus, if the reproduction of the last piece of main data recorded on the information record medium, or the piece of main data instructed to be finally reproduced is finished, the reproduction of the information record medium can be certainly and reliably finished without performing unnecessary operations.

The above mentioned second object of the present invention can be achieved by a system for reproducing each piece of main data recorded on an information record medium, on which each piece of sub code data corresponding to each piece of main data is also recorded to indicate information for controlling the reproduction of each piece of main data. The sub code data include a first data portion, which value changes when the reproduction of each piece of main data is ended, and a second data portion, which value changes in correspondence with a content of the main data and has a predetermined relationship with a value of the first data portion. The system is provided with: a read device for reading the main data and the sub code data on a basis of a predetermined clock; a change detection device for detecting a change in the value of the first data portion during the reproduction of each piece of main data; a current value detection device for detecting a current value of the second data portion when the change is detected by the change detection device; a judgement device for judging whether or not the detected current value of the second data portion is equal to a predetermined value of the second data portion, which is supposed to be obtained when the first data portion is normally changed at the end of the reproduction of each piece of main data; and an end detection device for detecting an end of a reproduction of each piece of main data on the basis of a result of judgement by the judgement device, the system reproducing each piece of main data in accordance with the end of there production detected by the end detection device.

In the operation of the system of the present invention, while the main data as well as the sub code data are read by the read device, a change in the value of the first data portion is detected by the change detection device. When the change is detected by the change detection device, a current value of the second data portion is detected by the current value detection device. Then, it is judged whether or not the detected current value of the second data portion is equal to a predetermined value of the second data portion, which is supposed to be obtained when the first data portion is normally changed at the end of the reproduction of each piece of main data, by the judgement device. Then, the end of the reproduction of each piece of main data is finally detected by the end detection device, on the basis of a result of judgement by the judgement device.

Accordingly, it is possible to detect the end of reproduction of each piece of main data correctly even if the first data portion of the sub code data is erroneously changed due to the noise mixed into the clock for detecting the sub code data in the same manner as the method of the present invention. Thus, in accordance with the end of the reproduction of each piece of main data detected by the end detection device, the special reproduction such as a random reproduction, a repeated reproduction and a programmed reproduction can be correctly performed even if the detection of the sub code data is influenced by the noise, according to the system of the present invention.

In one aspect of the system of the present invention, the read device may be provided with a plurality of CD players, and the system may be further provided with a switch device for switching outputs of the plurality of CD players to selectively output one of the outputs to the change detection device and the current value detection device. Thus, a plurality of CD players can be controlled by a single controller constituting the detection devices and the judgement device in the system. Here, although the transmission line for the clock is relatively long for the plurality of CD players so that the noise may be easily mixed into the clock, still the end of the reproduction of each piece of main data can be correctly detected, which is a great advantage.

In another aspect of the system of the present invention, it may be preferable that, if the current value of the second data portion is not judged to be equal to the predetermined value by the judgement device, the sub code data currently read by the read device is neglected so that the system keeps reproducing each piece of main data in accordance with the sub code data previously read by the read device. Thus, the reproducing operation such as an audio sound generation on a speaker and a video image display on a display device can be correctly continued by use of the previously read sub code data even if the current detection of the sub code data is erroneous due to the noise mixed into the clock.

In the above described method, apparatus and system of the present invention, the first data portion may be track number data which indicate a serial number of pieces of main data within the information record medium, and the second data portion may be index data which indicate a position within each piece of main data. Further, each piece of main data may be a piece of music, the first data portion may be a music number data which indicate a serial music number within the information record medium, and the second data portion may be index data which indicate a position within each piece of music. Alternatively, each piece of main data may be a movement of one piece of music, the first data portion may be a movement number data which indicate a serial movement number of one piece of music, and the second data portion may be an index data which indicate a position within each movement.

The nature, utility, and further features of this invention wilt be more clearly apparent from the following detailed description with respect to preferred embodiments of the invention when read in conjunction with the accompanying drawings briefly described below.

BRIEF DESCRIPTION OF THE DRAWINGS

FIG. 12 is a flow chart showing the operation of a third embodiment of the present invention.

DETAILED DESCRIPTION OF THE PREFERRED EMBODIMENTS

Referring to the accompanying drawings, embodiments of the present invention will be now explained.

FIRST EMBODIMENT (A) Construction of CD player

Figure 1:
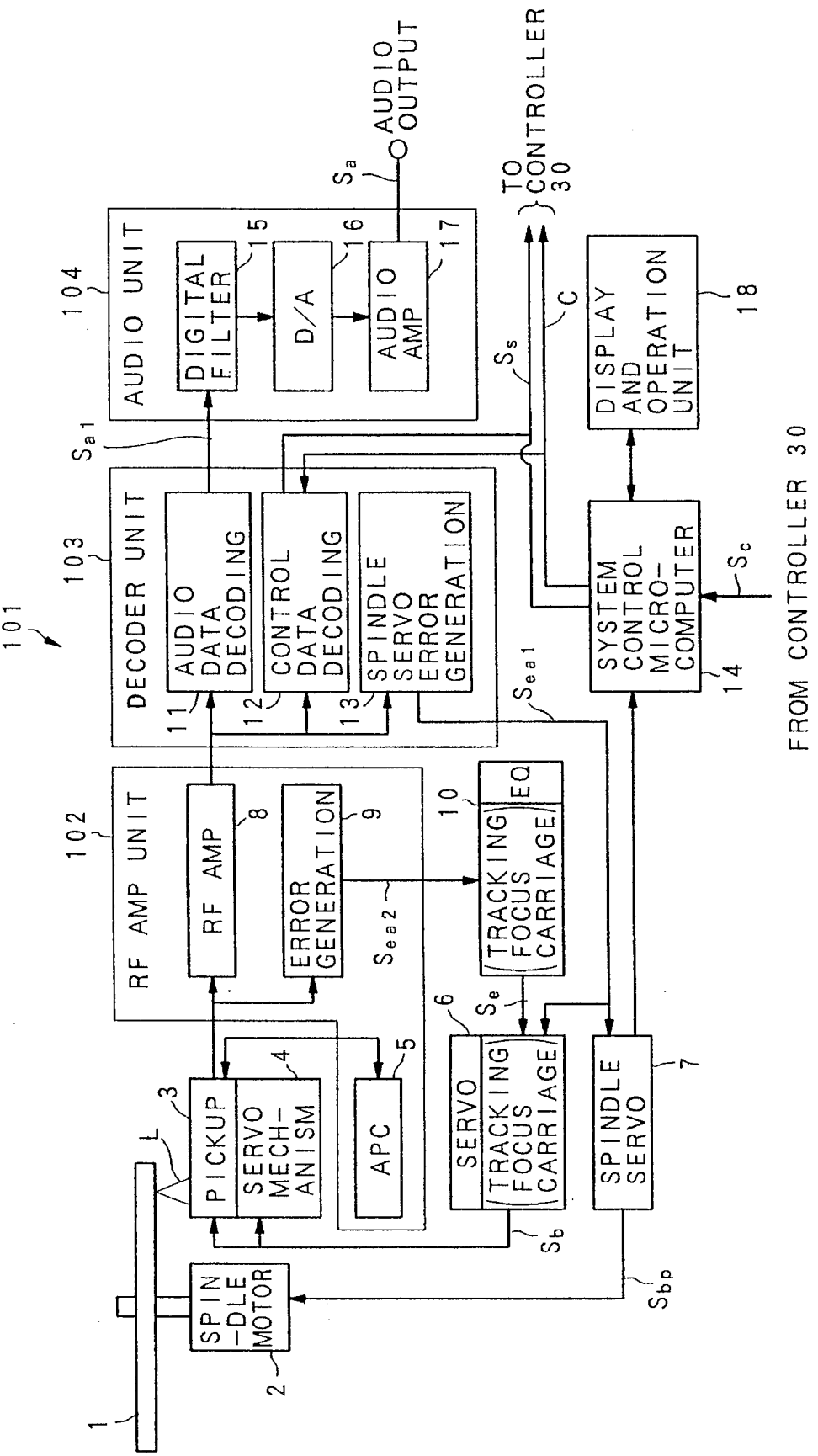
FIG. 1 is a block diagram of a CD player as one portion of a reproducing system of a first embodiment of the present invention.

First of all a construction of a CD player, which is controlled by a controller, as one portion of a reproducing system of the first embodiment is explained with referring to FIG. 1.

In FIG. 1, a CD player 101 for reproducing an optical disc 1 is provided with a spindle motor 2, an optical pickup 3, a servo mechanism 4, an APC (Automatic Power Controller) 5, a servo unit 6, a spindle servo unit 7, an RF (Radio Frequency) amplifier 8, an error generation unit 9, an equalizer (EQ) 10, an audio data decoding portion 11, a control data decoding portion 12, a spindle servo error generation unit 13, a system controlling microcomputer 14 a digital filter 15, a D/A (Digital to Analog) convertor 16, an audio amplifier 17, and a display and operation unit 18. The APC 5, the RF amplifier 8 and the error generation unit 9 constitute an RF amplifier unit 102. The audio data decoding portion 11, the control data decoding portion 12 and the spindle servo error generation unit 13 constitute a decoder unit 103. The digital filter 15, the D/A convertor 16 and the audio amplifier 17 constitute an audio unit 104.

The spindle motor 2 rotates the optical disc 1 such as a CD, to which sub code data are recorded together with the main data such as music data, on the basis of a servo signal Sbp. The pickup 3 irradiates the optical disc 1 with a detection light L, receives the reflected light and converts it to an electric signal (i.e. RF signal). The servo mechanism 4 performs each servo operation of the tracking, focusing and carriage. The APC 5 controls the detection light L on the basis of the output signal of the pickup 3 so as to obtain the optimum detection light L. The servo unit 6 outputs a servo signal Sb to perform tracking, focusing and carriage of the pickup 3 on the basis of the equalizer signal Se. The spindle servo unit 7 outputs the servo signal Sbp to control the spindle motor 2 on the basis of an error signal Seal under the control of the system control microcomputer 14. The RF amplifier 8 amplifies the RF signal outputted from the pickup 3. The error generation unit 9 detects the tracking error, the focusing error and the carriage error on the basis of the RF signal outputted from the pickup 3 to output an error signal Sea2. The equalizer 10 outputs an equalizer signal Se to perform the tracking servo, the focusing servo and the carriage servo operations on the basis of the error signal Sea2. The audio data decoding portion 11 decodes the audio data from the output of the RF amplifier unit 8, to output an audio signal Sal. The control data decoding portion 12 decodes and outputs sub code data Ss from the output of the RF amplifier 8 on the basis of a clock C outputted from the system control microcomputer 14. The spindle servo error generation unit 13 generates a spindle servo error on the basis of the output of the RF amplifier 8, and outputs the error signal Seal on the basis of the generated servo error. The digital filter 15 cuts unnecessary noise components from the output of the audio signal Sal. The D/A convertor 16 D/A-converts the output of the digital filter 15. The audio amplifier 17 includes a LPF (Low Pass Filter), and amplifies the audio component while removing the noise in the high frequency domain out of the output of the D/A convertor 16, to output an audio signal Sa. The system control microcomputer 14 outputs the clock C and controls the whole portion of the CD player 101 on the basis of the control signal Sc sent from a controller 30 (which will be explained in detail with referring to FIG. 2). The display and operation unit 18 performs various displays on the basis of the output of the system control microcomputer 14, and outputs the control signals corresponding to each input operation with respect to the input operation from the external.

Here, as described above, each time the rising up of one clock C from the system control microcomputer 14 is detected by the control data decoding portion 12, one bit of the decoded sub code data Ss are outputted. Then, each time the clock C falls down, the system control microcomputer 14 takes in the sub code data Ss which are outputted from the control data decoding portion 12 at the moment.

The clock C and the sub code data Ss are outputted to the controller 30 (which will be explained in detail with referring to FIG. 2).

(B) Construction of Controller

Figure 2:
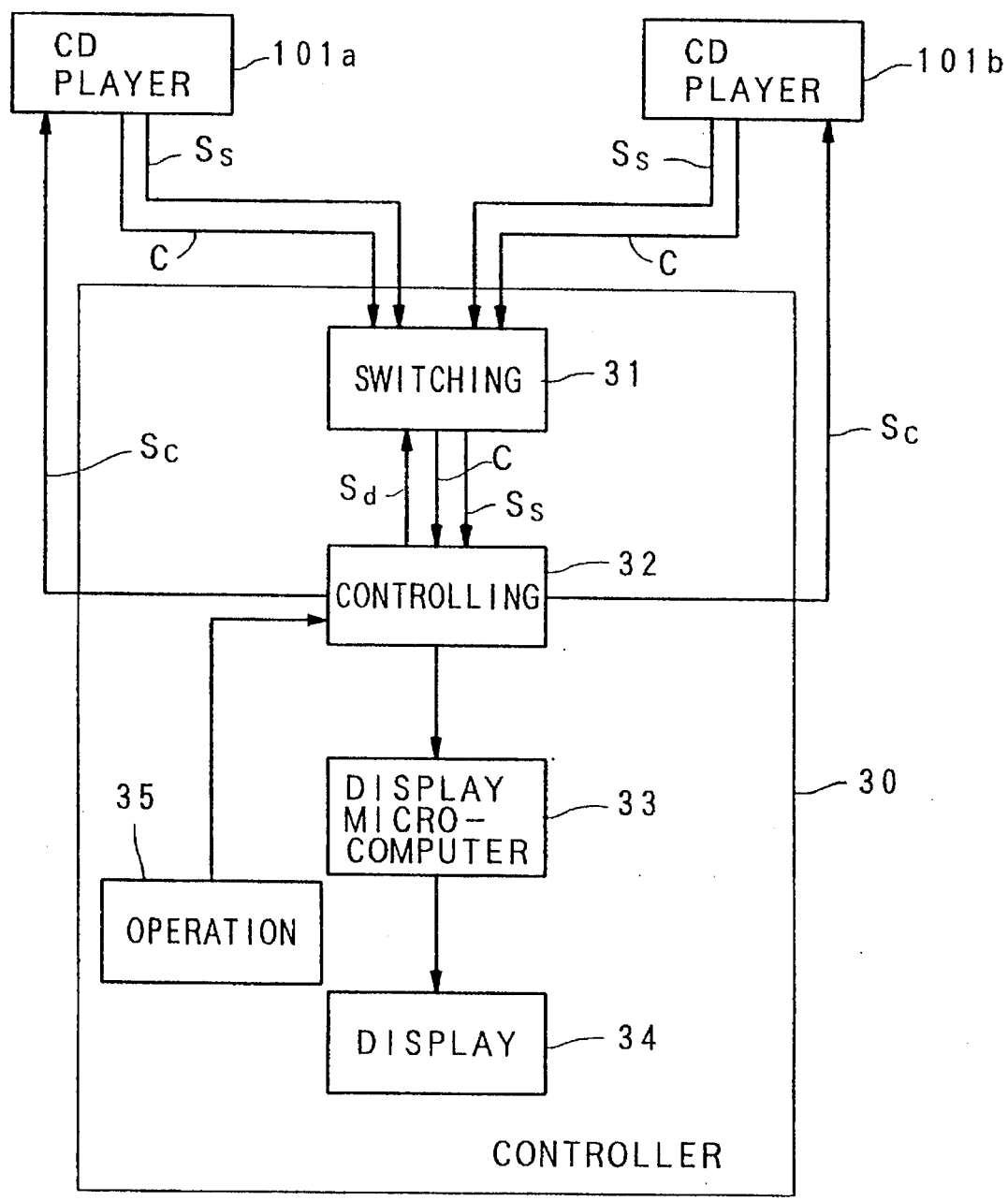
FIG. 2 is a block diagram of the reproducing system including a controller and a plurality of CD players of the first embodiment.

Nextly, the controller 30 for controlling the CD player 101 of FIG. 1 is explained with referring to FIG. 2. As shown in FIG. 2, the reproducing system of the first embodiment is provided with the controller 30 and a plurality of CD players 101a and 101b each of which has the same construction as the CD player 101 of FIG. 1.

In FIG. 2, the CD players 101a and 101b are connected to one controller 30, so that one controller can control a plurality of CD players to selectively reproduce and stop one of them, and that the normal reproduction (i.e. the reproduction of the main data in the order of record) and the aforementioned special reproduction (e.g. a random reproduction, a repeated reproduction and a programmed reproduction) can be performed by the plurality of CD players.

In the controller 30 of FIG. 2, a switching unit 31 switches the signals from the CD players 101a and 101b on the basis of the control signal Sd from a controlling unit 32. The controlling unit 32 outputs the control signal Sc to each of the CD players 101a and 101b to control the operations of the CD players 101a and 101b on the basis of the clock C and the sub code data Ss from the switching unit 31, according to an input signal inputted through an operation unit 35. A display microcomputer 33 performs the process for necessary display on the basis of the output of the controlling unit 32. A display unit 34 performs various displays on the basis of the output of the display microcomputer 33.

In the above explained construction of the controller 30, the operation to detect the end of reproduction of main data is mainly performed by the controlling unit 32.

(C) Data Structure

Nextly, the content of the sub code data which are recorded on the CD in the present embodiment will be explained with referring to FIG. 3 to FIG. 5.

Figure 3:
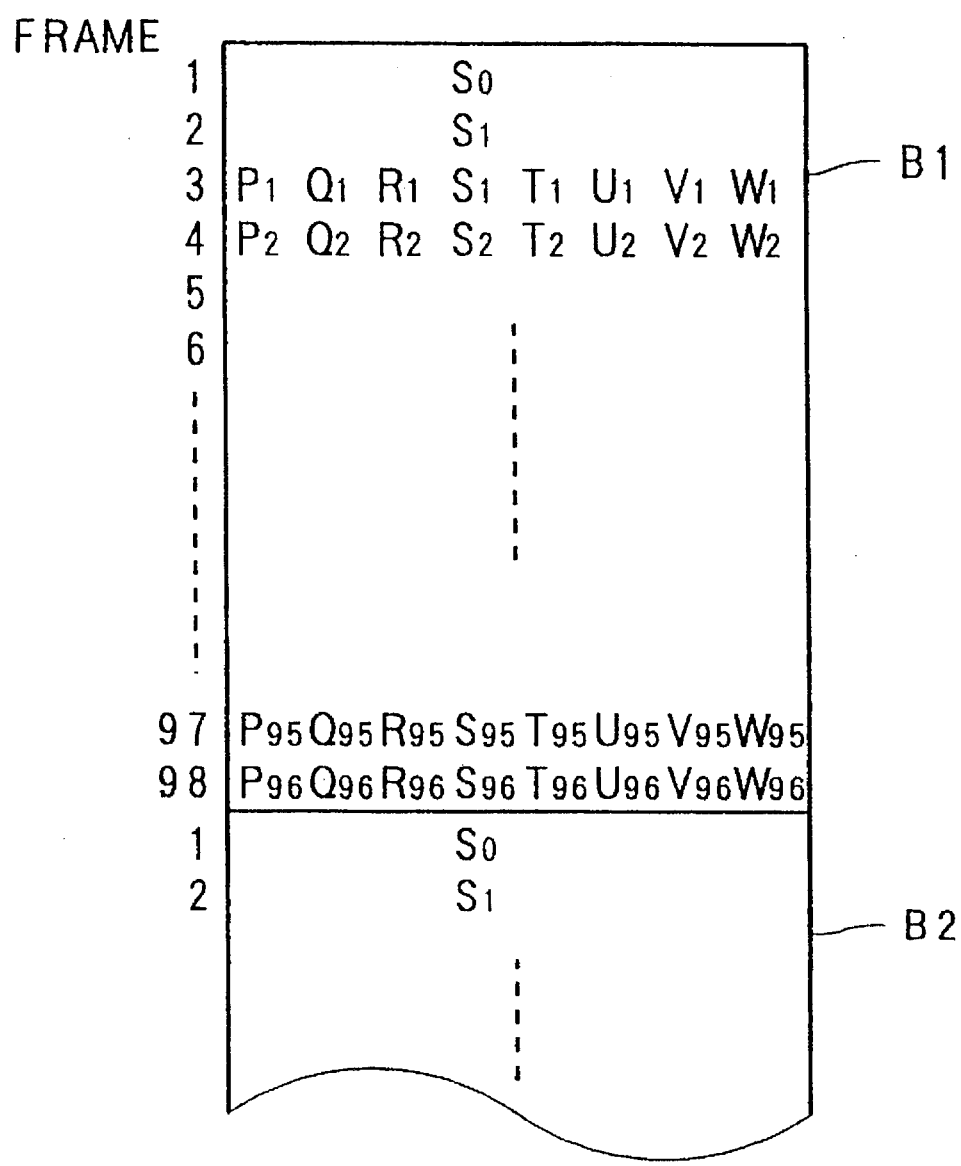
FIG. 3 is a diagram showing a data structure of the sub code data used in the first embodiment.

FIG. 3 shows a whole data structure of the sub code data.

In FIG. 3, the sub code data have a plurality of blocks B1, B2, . . . , each of which includes 98 frames. The 1st and 2nd frames have synchronization patterns $S_0$ and $S_1$, and the 3rd to 98th frames have P to W channels. Each frame corresponds to 1 bytes, while each channel corresponds to 1 bit. For the special reproduction purpose, the P channel (P1 to P96) and the Q channel (Q1 to Q96) are used in this example.

The P channel indicates the logical value of "1" at a portion between one main data and another main data except the main data at the end of record. The P channel indicates the logical value "0" at a portion at the lead in area. Further, at a portion of the lead out area, the P channel is constructed such that the logical values "1" ant "0" are repeated by about 2 Hz frequency. The main data recorded at the end are constructed such that the logic value "1" is indicated for the last 2 to 3 seconds. The P channel is provided mainly in order to allow a rough detection of the beginning of each main data.

Figure 4:
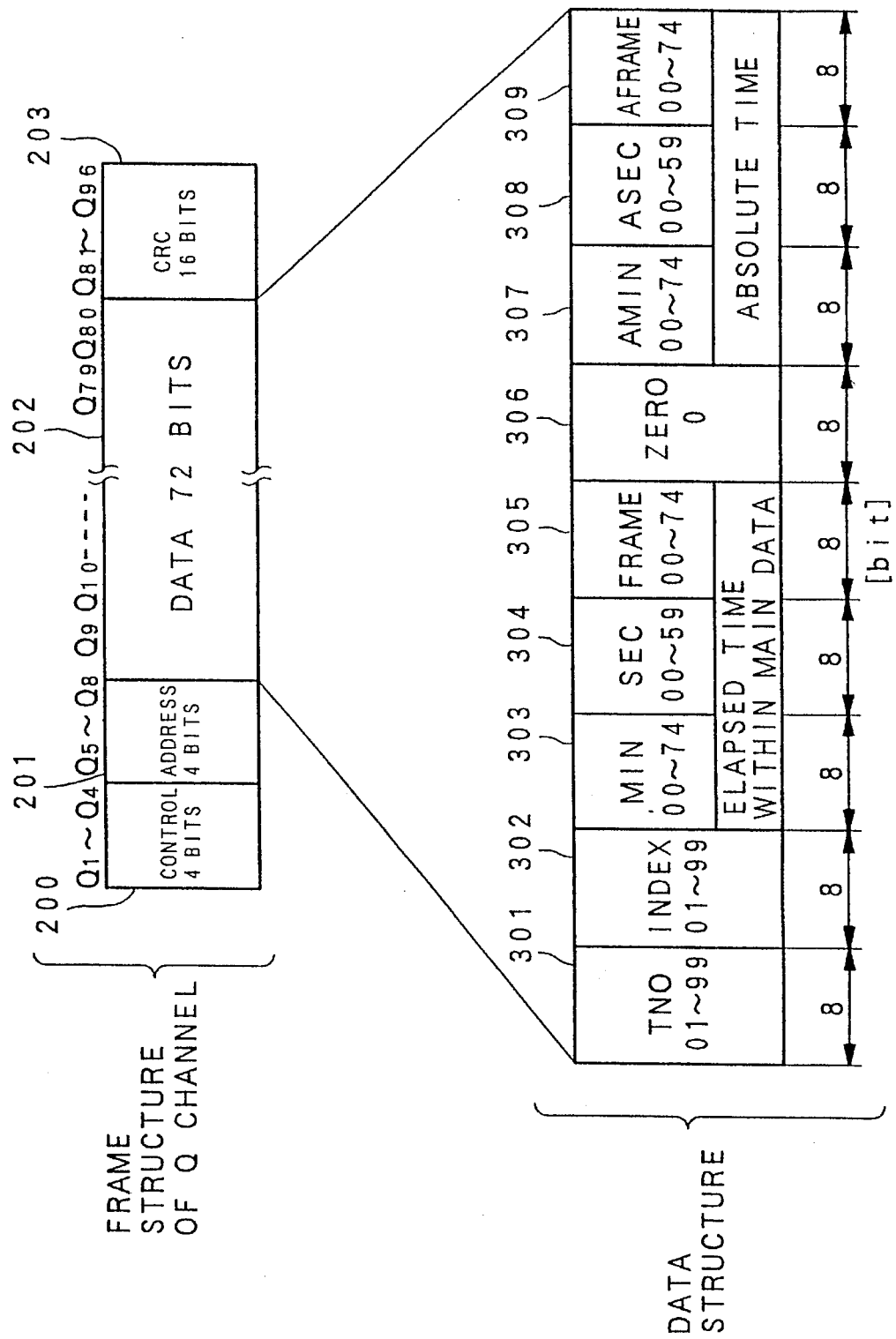
FIG. 4 is a diagram showing a frame structure of Q channel and a data structure of the data portion thereof corresponding to the main data in the first embodiment.

Nextly, the Q channel is explained with referring to FIG. 4.

FIG. 4 shows a frame structure of the Q channel at the upper portion of the figure, and a data structure at the lower portion of the figure.

As shown in the frame structure of the Q channel of FIG. 4, the data of the Q channel include control bits 200 (consisting of 4 bits) for audio channel number, emphasis, identification of digital data, address bits 201 (consisting of 4 bits) indicating the maker code etc., data bits 202 (consisting of 72 bits) which are the concrete data corresponding to the main data, and CRC (Cyclic Redundancy Code) bits 203 (consisting of 16 bits) for detecting the error in the CRC.

As shown in the data structure of FIG. 4, the data bits 202 include: main data number (TNO) 301 which indicates the number of the recorded main data and which is expressed by the BCD (Binary Coded Decimal character) code of 2 digits; index (INDEX) data 302 which indicate the number of more finely divided main data and which are expressed by the BCD code of 2 digits; minute (MIN) data 303 expressed by the BCD code of 2 digits, second (SEC) data 304 expressed by the BCD code of 2 digits and frame number (FRAME) data 305 expressed by the BCD code of 2 digits, which indicate an elapsed time from the beginning of the main data within the main data; zero (ZERO) data 306 for combining the data; absolute minute (AMIN) data 307 expressed by the BCD code of 2 digits, absolute second (ASEC) data 308 expressed by the BCD code of 2 digits and absolute frame number (AFRAME) data 309 expressed by the BCD code of 2 digits, which indicate an absolute elapsed time for the whole reproduction time from the end of the lead in area.

Nextly, in order to explain the relationship between the main data and the sub code data, the case where a CD recorded with music is reproduced, the main data are movements of the music, one piece of music consists of 3 movements, and where only one piece of music is recorded on the CD, will be explained with referring to FIG. 5.

Figure 5:
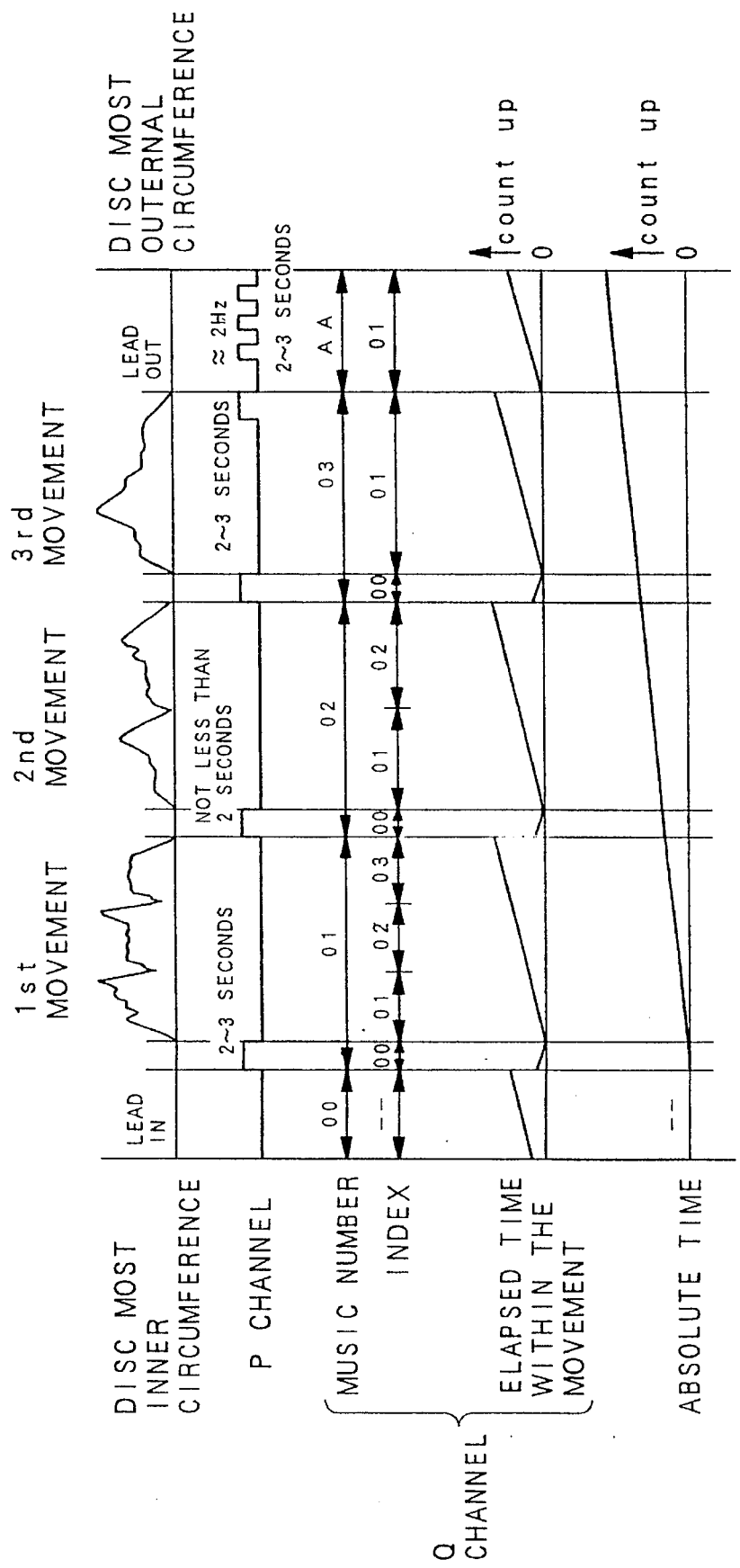
FIG. 5 is a timing chart of the sub code data used in the first embodiment.

In FIG. 5, the main data number (which corresponds to the music number in this case) 301 is "00" at the lead in area, is "01" after the lead in area until the 1st main data (i.e. the 1st movement) is completed, and is "02" after the 1st movement is completed until the 2nd moment is completed. In the same manner, the main data number 301 is "03" after the 2nd movement is completed until the 3rd movement is completed, and is "AA" at the final lead out area.

The index data 302 is "00" after the lead in area is ended until the 1st movement is started, and after that, is incremented as "01", "02", "03" according to the division within the 1st movement. Then, at a portion between the 1st movement and the 2nd movement, the index data is "00" again, and after that, is incremented again according to the division in the 2nd movement. The same thing can be said as for the 3rd movement. At the lead out area, the index data 302 is "01".

The elapsed time within each movement (i.e. the minute data 303, the second data 304 and the frame data 305 of FIG. 4) is reduced at a portion between the adjacent movements, and zero-starts at the first portion of each movement, and, after that, is counted-up within each movement.

The absolute elapsed time (i.e. the absolute minute data 307, the absolute second data 308 and the absolute frame data 309 of FIG. 4) zero-starts at the time when the lead in area is ended, and, after that, is counted-up through all of the movements.

(D) Detection of Clock and Sub Code Data

Nextly, the detection of the clock and the detection of the sub code data are explained with referring to FIG. 2 and FIGS. 6 to 8.

In summary, in FIG. 2, when the decoder unit in the CD player 101a or 101b detects the rising up of one clock, the decoder unit outputs the decoded sub code data Ss of one bit and keeps outputting the same sub code data Ss of one bit on the data line until it detects the rising up of the next clock. On the other hand, when the controller 30 and the system control microcomputer of the CD player 101a (101b) detect the falling down of the clock, they take in the sub code data Ss currently outputted on the data line.

Figure 6:
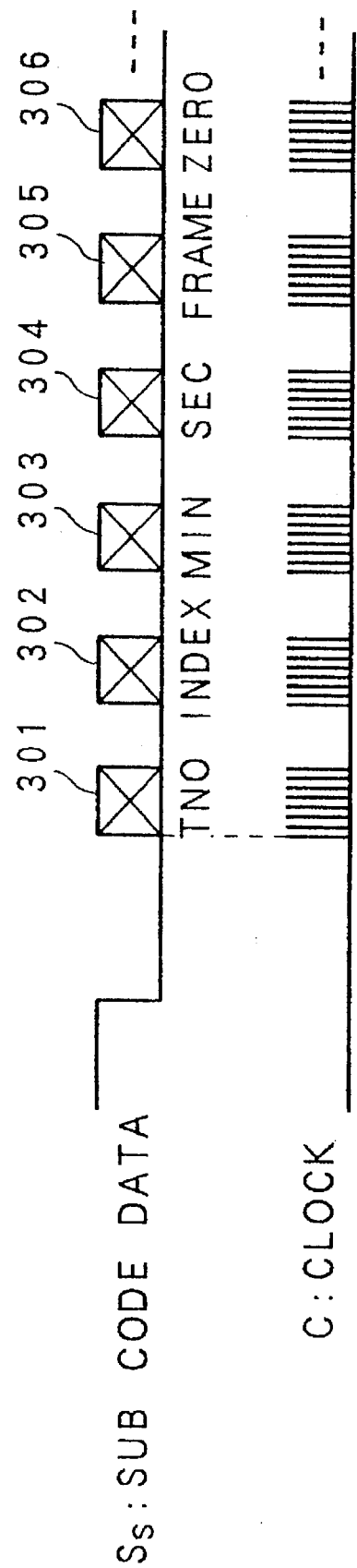
FIG. 6 is a timing chart showing the relationship between the sub code data and the clock.

FIG. 6 shows the relationship between the sub code data and the clock. As explained above by use of FIG. 4, each data e.g. TNO, INDEX, MIN, . . . , constructing the sub code data are 8 bits data respectively. Thus, when the 8 clocks have been outputted, one data e.g. TNO, INDEX, MIN, . . . , of the sub code data are taken in as shown in FIG. 6.

Figure 7:
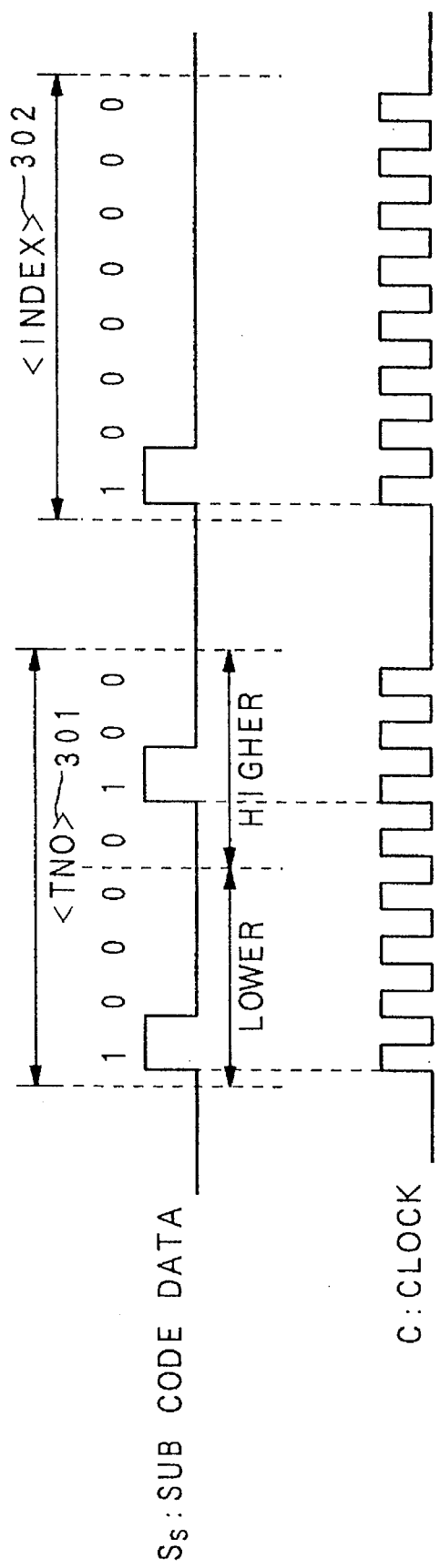
FIG. 7 is an enlarged timing chart showing one portion of FIG. 6.

FIG. 7 shows a magnified view of FIG. 6 at the portion of the main data number 301 (TNO) and the index data 302 (INDEX). Each data are outputted by one bit in correspondence with each clock as shown in FIG. 7.

Here, since the main data number 301 is expressed by the BCD code, the first 4 bits indicate the 1st order (lower order bits) of the decimal, and the next 4 bits indicate the tenth order of the decimal (higher order bits). Thus, in case of FIG. 7, since the first 4 bits "0001" indicates "1" by the decimal and since the next 4 bits "0010" indicates "2" by the decimal, the main data number becomes as followings.

main data number=21

In the controller 30 of FIG. 2, the sub code data Ss are taken in this manner in accordance with the clock C.

Here, it is to be noted that the detection of the end of the reproduction of each movement (i.e. the end of each piece of main data) can be performed by simply detecting the switch timing of the main data number 301 for the special reproduction. Namely, since the main data number 301 is incremented by one each time when one piece of main data is completed, the end of each piece of main data can be detected by detecting this change in the main data number 301. More concretely, by reading and holding the main data number 301 during the reproduction of each piece of main data per each clock, and by comparing the main data number 301, which is read at time T1 of one clock, with the main data number 301, which is read at the time T2 of another clock next to the one clock, it can be judged that the reproduction of the main data is in the middle if the compared main data numbers are coincident to each other. Alternatively, if the compared main data numbers are not coincident to each other, it can be judged that the reproduction of the main data is completed. In this manner, this simple detection technique to detect the end of the reproduction of each piece of main data by simply detecting the switch timing of the main data number 301 works well if there exists no noise in the clock. However, in the practical cases, there certainly exists such a case where a noise is mixed into the clock as the standard to detect the switch timing of the main data number 301. The influence of such a noise in the clock onto the detection of the sub code data will be discussed here in more detail with referring to FIG. 8.

Figure 8:
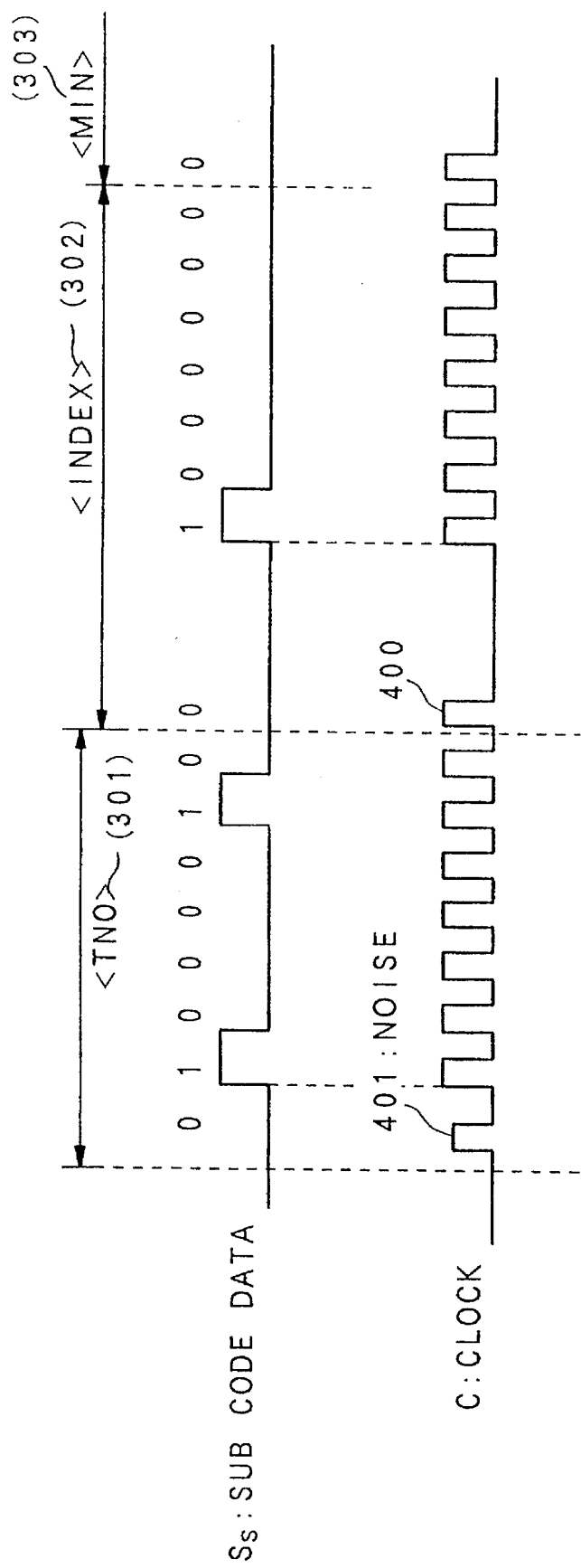
FIG. 8 is a timing chart showing the relationship between the sub code data and the clock in a case where the noise is mixed into the clock.

In FIG. 8, when a noise 401 is mixed into the clock for detecting the main data number 301, the controller erroneously recognizes the noise 401 as the clock, so that the controller takes in the 8 bits amount of data from the data corresponding to the noise 401 (i.e. "0" in FIG. 8 ) as the main data number 301. Then, in the example of FIG. 8, since the first 4 bits of the sub code data indicate "0100", and since the next 4 bits indicate "0010", the main data number becomes as following.

main data number=42.

This number is significantly different from the correct value "21" of the main data number 301 of FIG. 7. If the controller would perform the special reproduction on the basis of such an erroneous detection of the end of the reproduction of the main data in this manner, the reproduction of each piece of main data will be erroneously stopped suddenly in the middle of its reproduction.

Further, in case of the normal continuous reproduction, if the noise is mixed into the clock when the main data number 301 indicates "55" by the decimal i.e. "10101010" by the binary on the transmission line, the main data number 301 is erroneously read as "01010101" by the binary i.e. "AA" by the decimal on the transmission line. Thus, if the normal continuous reproduction would be performed according to such an erroneous detection of the main data number, the reproduction of the main data will be erroneously finished in the middle of the reproduction since the "AA" of the main data number 301 is supposed to indicate the lead out area.

Accordingly, the present embodiments employs more sophisticated and unique technique to detect the end of the reproduction of each piece of main data as described below.

(E) Detection of End of Reproduction of Each Piece of Main Data

Nextly, it will be explained the method of detecting the end of the reproduction of each piece of main data in the first embodiment, in which a CD recorded with a plurality of pieces of music as the main data is reproduced. Namely, the main data corresponds to one piece of music, and the main data number (TNO) data as the first sub code data corresponds to the music number data.

(E-1) At the time of Special reproduction

Firstly, the operation at the time of special reproduction will be explained with referring to FIG. 9.

Figure 9:
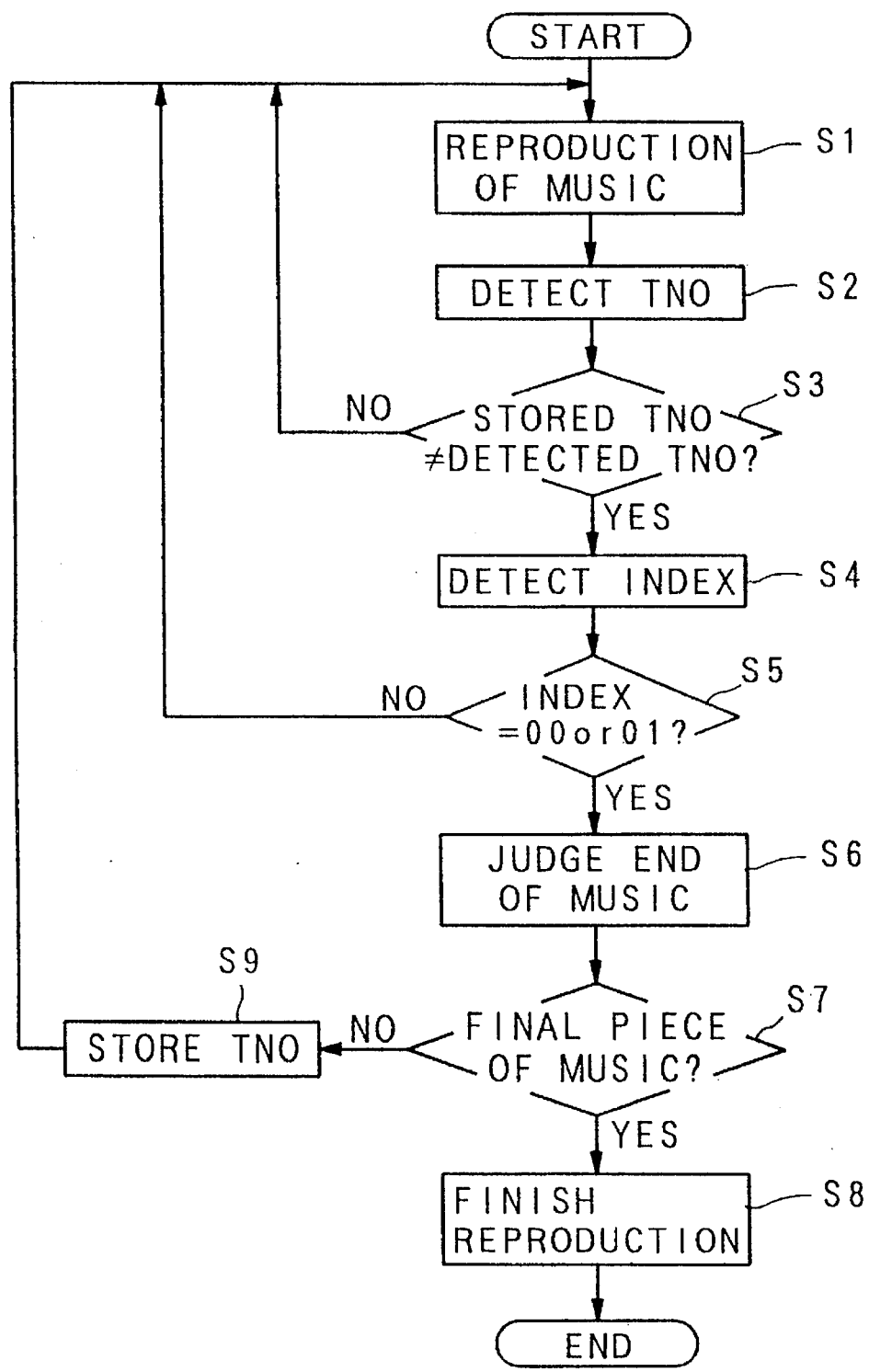
FIG. 9 is a flow chart showing the special reproducing operation of the first embodiment.

In FIG. 9, the music is reproduced (step S1), and the music number (TNO) data 301 are detected from the sub code data (step S2).

Here, in case that the reproduced music is the first piece of music, the music number data 301 is stored just once. Namely, in case of performing the process of the step S2 again during reproducing the first piece of music, the music number data 301 are not stored.

Then, the detected music number (TNO) data 301 are compared with the stored music number (TNO) data 301 (step S3). Then, if these music number data 301 are coincident (step S3, NO), it is judged that it is in the middle of the reproduction of one piece of music, so that the flow returns to the step S1 and the reproduction is continued as it is.

If these music number data 301 are not coincident, namely, if the change in the music number data 301 is detected (step S3, YES), the index (INDEX) data 302 (which are included in the sub code data as shown in FIG. 4) are detected (step S4). Then, it is judged whether or not the value of the index data 302 is "00" or "01" (step S5).

Here, if the music number (TNO) data 301 is changed in the middle of one piece of music because of the noise, the data constructing the music number data 301 is off-set because the noise is erroneously recognized as the clock as explained with FIG. 8. Thus, the data which is supposed to correspond to the final bit of the music number data 301 is erroneously recognized as the first data of the index data 302 (as shown by a reference numeral 400 in FIG. 8).

By the way, this erroneously recognized data indicates "0" or "1" by the binary number. Since the index data 302 always take the value of not less than "01" in the middle of one piece of music, it never take the value of "00" (on the transmission line, this value "00" corresponds to "00000000"). Accordingly, by the offset of the data, even if the data which is supposed to correspond to the final bit of the music number data 301 is erroneously recognized as the first bit of the index data 302 (i.e. even if "0" or "1" becomes the first bit of the index data 302 ) by the off-set of the data, the value of the index data 302 never becomes "00" (on the transmission line, this value "00" corresponds to "00000000") or "01" (on the transmission line, this value "01" corresponds to "10000000") in the middle of the reproduction of one piece of music.

Therefore, at the step S5, if the index data 302 is not "00" or "01" (step S5, NO), it is recognized that the middle portion of one piece of music is being reproduced, so that the flow returns to the step S1 and the reproduction is continued as it is. At the step S5, if the index data 302 is "00" or "01" (step S5, YES), it is judged that the music is not in the middle i.e. the reproduction of one piece of music is just completed (step S6). Then, it is judged whether or not the completed piece of music is the final piece of music to be reproduced according to the program to perform the special reproduction (step S7). If it is not the final piece of music to be reproduced (step S7, NO), the music number data 301 are stored (step S9), and the flow returns to the step S1 so as to reproduce the next piece of music. If it is the final piece of music to be reproduced (step S7, YES), the reproduction is finished (step S8), and the special operation is ended.

In case that the clock C is shifted due to the noise during the reproduction of the portion where the value of the index data 302 is "80" (which is transmitted on the transmission line as "1000000", and that the sub code data are shifted in due course, the value of the index data 302 becomes "00" (which is transmitted on the transmission line as "0000000") or "01" ( which is transmitted on the transmission line as "00000001") even in the middle of one piece of music. However, since the possibility that the value of the index data 302 becomes "80" is as little as one hundredth of the total possibility for the index data 302, and since it is practically very rare that the value of the index data 302 becomes as large as "80", it hardly cause any problem in a practical sense.

(E-2) At the time of Normal Reproduction

Nextly, the operation at the time of normal continuous reproduction will be explained with referring to FIG. 10. In the normal continuous operation, when the music number data 301 is changed, it is detected whether or not it is at the lead out area.

Figure 10:
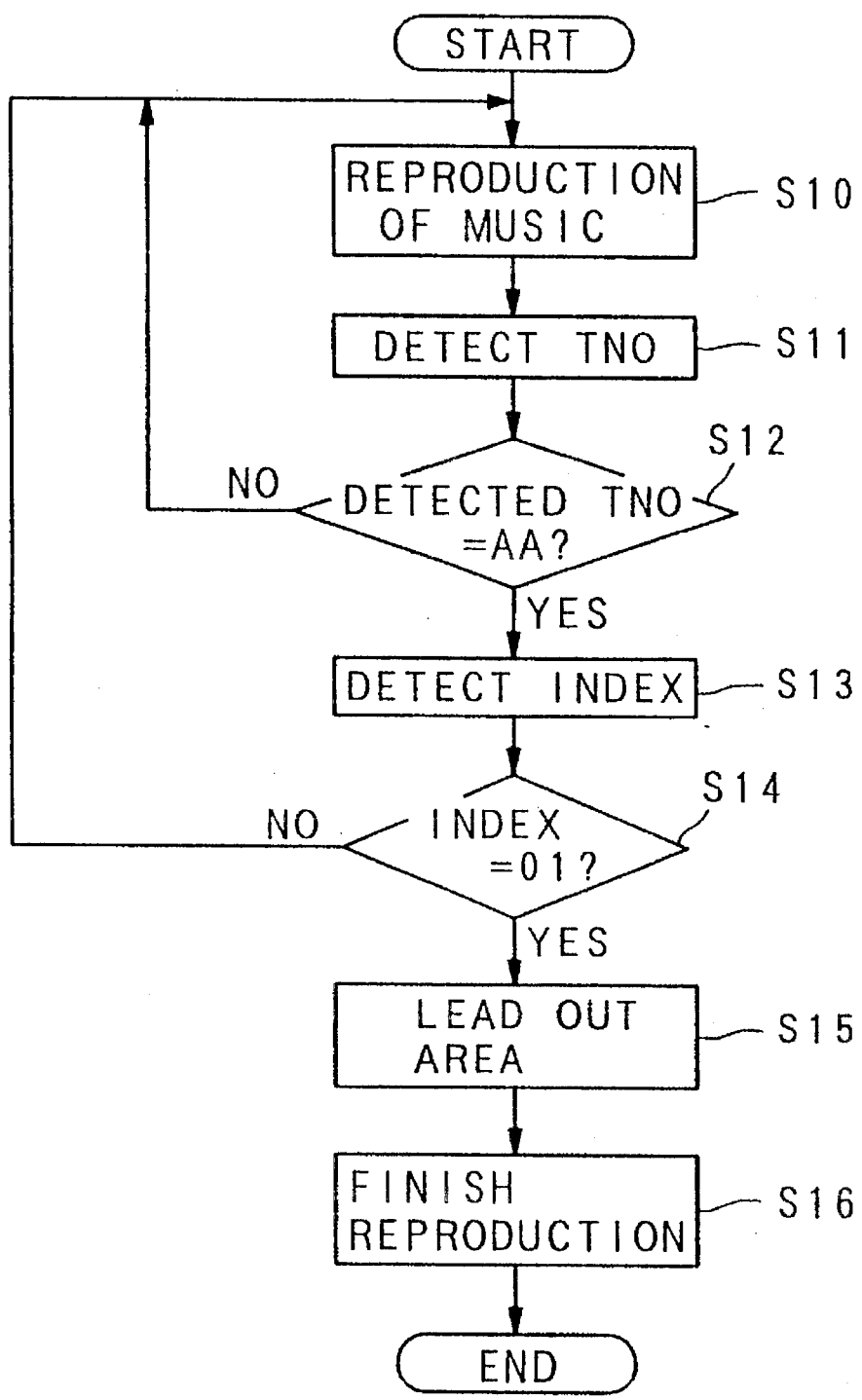
FIG. 10 is a flow chart showing the normal reproducing operation of the first embodiment.

In FIG. 10, the music is reproduced ( step S10 ), and the music number (TNO) data 301 are detected from the sub code data (step S11). Then, it is judged whether or not the music number data 301 are changed to be "AA" (step S12). Then, if the music number data 301 are not to be "AA" (step S12, NO), it is judged that it is in the middle of the reproduction of one piece of music, so that the flow returns to the step S10, and the reproduction will be continued as it is.

If the music number data 301 equals to "AA" (step S12, YES), the index data 302 included in the sub code data are detected (step S13). Then, it is judged whether or not the value of the index data 302 is "01" (step S14).

Here, as described above, even if the noise is mixed in the middle of one piece of music, the index data 302 never become "01". On the contrary, at the lead out area, the index data 302 are always "01".

Therefore, at the step S14, if the index data 302 are not "01" (step S14, NO), it is recognized that the middle portion of one piece of music is being reproduced, so that the flow returns to the step S10, and the reproduction is continued as it is.

At the step S14, if the index data 302 are "01" (step S14, YES), it iS judged to be the lead out area (step S15), and the reproduction is finished (step S16).

In the above explained first embodiment, at the time of special reproduction, even if the music number data 301 are changed due to the noise in the middle of one piece of music, the fact that it is in the middle of the music can be recognized by detecting the index data 302, so that the reproduction is not erroneously stopped in the middle of the reproduction.

Further, at the time of normal reproduction, even if the music number data 301 are changed to the "AA" in the middle of music, since the fact that it is in the middle of music can be recognized by detecting the index data 302, the reproduction is not erroneously stopped in the middle and that the lead out area can be correctly detected after the reproduction of the final music.

SECOND EMBODIMENT

Nextly, the second embodiment of the present invention will be explained with referring to FIG. 11.

The constructions of the CD players and the controller in the reproducing system of the second embodiment, as well as the data structure and the detection of the clock and the sub Code data, are the same as the first embodiment of FIGS. 1 and 2. The detection of the end of the reproduction of each piece of main data of the second embodiment is different from that of the first embodiment in that the controller of the second embodiment employs a more concrete standard for judgement than the first embodiment at the time of detecting the change in the music number data 301, as following. The second embodiment reproduces a CD, to which a plurality of pieces of music are recorded as the main data, in the same manner as the first embodiment.

(A) Detection of End of Reproduction of Each Piece of Main Data (A-1) At the time of Special Reproduction Firstly, the operation at the time of special reproduction of the second embodiment will be explained with referring to FIG. 11.

Figure 11:
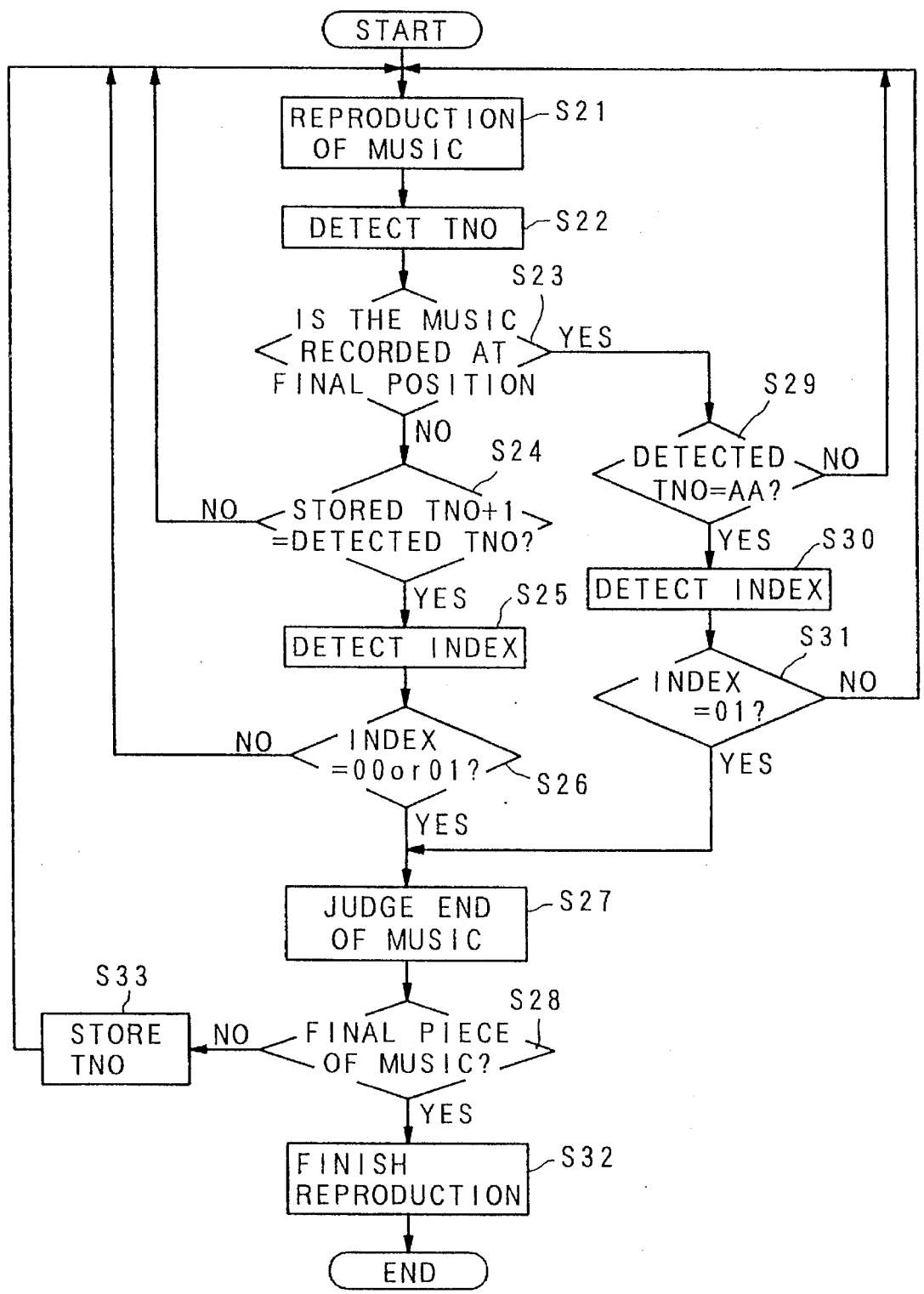
FIG. 11 is a flow chart showing the special reproducing operation of a second embodiment of the present invention.

In FIG. 11, the music is reproduced ( step S21 ), and the music number (TNO) data 301 are detected from the sub code data (step S22).

Here, in case that the reproduced piece of music is the first piece of music in the CD, the music number data 301 are stored just once. Namely, in case of performing the process of the step S22 again during the reproduction of the first piece of music, the music number data 301 are not stored.

Nextly, it is judged whether or not the piece of music which is currently being reproduced is the piece of music which is recorded at the final position of the CD (step S23).

Here, the reason for performing this judgement of the step S23 especially in the second embodiment is as following. Namely, at a step S24 explained later, the change in the music number data 301 will be detected by judging whether or not the value of the currently detected music number data 301 is equal to the value obtained by adding "1" onto the value of the stored music number data 301 which has been previously detected and then stored. Therefore, with respect to the final piece of music, which is recorded at the final position of the CD, if the judgement at the step S24 would be performed without the step S23, even in case of the correct change in the music number data 301 (i.e. the change occurred when it is transferred from the piece of music recorded at the final position to the lead out area), the judgement at the step S24 will result in "NO", to continue the reproduction although the reproduction should be finished at the lead out area. Accordingly, the step S23 is necessary to judge whether or not the currently reproduced piece of music is the piece recorded at the final position of the CD in advance of the step S24, so as to perform the process differently in accordance with the result of the judgement at the step S23.

At the step S23, if it is not the piece of music recorded at the final position (step S23, NO), it is judged whether or not the value of the currently detected music number data 301 is equal to the value obtained by adding "1" onto the previously detected and stored music number data 301, i.e. whether or not the music number data 301 is changed (step S24). Then, if it is not judged to be equal (step S24, NO), it is recognized that it is in the middle of the reproduction of one piece of music, so that the reproduction is continued as it is.

If it is judged to be equal (step S24, YES), it is recognized that the music number data 301 are changed, so that the index data 302 are detected included in the sub code data (step S25). Then, it is judged whether or not the value of the index data 302 is "00" or "01" (step S26).

Here, as explained in the first embodiment, even if the music number data 301 are changed in the middle of one piece of music because of the noise, the index data 302 never take the value of "00" or "01". Accordingly, if the value of the index data 302 is not "00" or "01" (step S26, NO), it is recognized that the middle portion of one piece of music is being currently reproduced, so that the flow returns to the step S21 and the reproduction is continued as it is.

On the other hand, at the step S26, if the value of the index data 302 is "00" or "01" (step S26, YES), it is recognized that it is not in the middle of one piece of music i.e. the reproduction of one piece of music is completed. Namely, it is judged to be the end of one piece of music (step S27). Then, it is judged whether or not this completed piece of music is the piece of music to be finally reproduced according to the program for the special reproduction (step S28). If it is not the piece of music to be finally reproduced (step S28, NO), the music number (TNO) data 301 are stored (step S33), and the flow returns to the step S21 so as to reproduce the next piece of music. If it is the piece of music to be finally reproduced (step S28, YES), the reproduction is finished (step S32).

On the other hand, at the step S23, if it is judged to be the piece of music recorded at the final position (step S23, YES), it is judged whether or not the value of the detected music number (TNO) data 301 is equal to "AA" (step S29). Then, if it is not judged to be equal to "AA" (step S29, NO), it is recognized that it is in the middle of the reproduction of one piece of music, so that the flow returns to the step S21 and the reproduction is continued as it is.

At the step S29, if the value of the detected music number data 301 is "AA" (step S29, YES), the index data 302 included in the sub code data are detected (step S30). Then, it is judged whether or not the value of the index data 302 is "01" ( step S31 ).

Here, as described above, even if the music number data 301 are changed due to the noise in the middle of one piece of music, the value of the index data 302 never becomes "01". Thus, if the value of the index data 302 is not "01" (step S31, NO), it is recognized that it is in the middle of the reproduction of one piece of music, so that the flow returns to the step S21 and the reproduction is continued as it is.

If the value of the index data 302 is "01" (step S31, YES), it is recognized that it is not in the middle of one piece of music i.e. the reproduction of one piece of the music is completed (step S27). Then, the aforementioned processes of the steps S28 and S33 are successively performed. (A-2) At the time of Normal Reproduction The operation at the time of normal reproduction in the second embodiment is the same as the first embodiment explained by use of FIG. 10.

According to the above explained second embodiment, the end of reproduction of each piece of music can be more certainly and reliably detected as compared with the first embodiment.

THIRD EMBODIMENT

Nextly, the third embodiment of the present invention will be explained with referring to FIG. 12. The constructions of the CD player and the controller in the reproducing system of the third embodiment, as well as the data structure and the detection of the clock and the sub code data, are the same as the first embodiment of FIGS. 1 and 2. The detection of the end of the reproduction of each piece of main data in the third embodiment is different from that of the first or second embodiment. Namely, in the first or second embodiment, the case where the error is generated due to the noise mixed on the transmission line upon the detection of the music number data 301 has been explained. However, there may be a case where the error is generated due to the noise upon the detection of the data other than the music number data among the sub code data. For example, in a case where the error is generated in the detection of the time information (e.g. the elapsed time data 303, 304 and 305, or the absolute time data 307, 308 and 309 of the main data in FIG. 4), the error on the display etc. may be generated.

In this manner, in the detection of the sub code data, it is necessary to detect the error in the same manner with respect to the data other than the music number data which is at the head of the sub code data.

Accordingly, the third embodiment is constructed such that the detecting method of the present invention is applied to the error detection for the whole data constructing the sub code data (e.g. the data 301 to 309 in FIG. 4).

The operation of the third embodiment will be explained with referring to FIG. 12.

The explanation here is made with respect to the case where the CD on which a plurality of pieces of music as the main data are recorded is reproduced in the same manner as the first and second embodiments.

Firstly, one piece of music is reproduced (step S40), and it is judged whether or not the corresponding sub code data are detected (step S41). If the sub code data are not detected (step S41, NO), the judgement is continued until the sub code data are detected. If the sub code data are detected (step S41, YES), it is judged whether or not there exists an error at any portion of the detected sub code data by referring to the data constructing the detected sub code data (step S42).

Here, the data, which are referred to at the time of detecting the error at the step S42, are not limited to the index data 302 as in the first and second embodiments, but may be any other data included in the sub code data. However, the data, which are referred to, are preferably the data which are detected from the timely behind portion of the sub code data (i.e. the timely later portion within one sub code data), in order to deal with the error included in any data within the sub code data.

As the more concrete error detection method of the third embodiment, if the value which the referred data cannot take is actually detected, it is judged that there exists an error in the sub code data which includes the referred data. For example, assuming that the SEC data 304 of FIG. 4 which are supposed to take the value between "0" to "59" are referred to, if the value not less than "60" is actually detected as the SEC data 304, it is judged that there exists an error in the sub code data including this SEC data 304. Especially, since all of 8 bits of the zero data 306 in FIG. 4 are supposed to be "0" in case of the normal condition, if there exists just one "1", it is judged that there exists an error in the sub code data including this zero data. In addition, since the zero data 306 are timely behind the SEC data 304 within one sub code data as shown in FIG. 4, the zero data 306 are more preferable as the data which are referred to for the error detection at the step S42.

At the step S42, if it is judged that there exists no error in the sub code data (step S42, NO), the process such as a displaying process is performed on the basis of the detected sub code data (step S43). Then the flow returns to the step S41 to detect the next sub code data.

At the step S42, if it is judged that there exists an error in the sub code data (step S42, YES), the display is performed on the basis of the stored sub code data, which has been detected before the currently detected sub code data, or the display corresponding to the currently detected sub code data is not performed since there exists the error (step S44). Nextly, it is judged whether or not the reproduction of the piece of music which is reproduced is finished (step S45). If it is not finished (step S45, NO), the flow returns to the step S41 so as to detect the next sub code data.

If it is finished (step S45, YES), it is further judged whether or not the piece of music which reproduction has been completed is the piece of music which should be finally reproduced (step S46). Then, if it is the music to be finally reproduced (step S46, YES), the reproduction is finished (step S47). If it is not the music to be finally reproduced (step S46, NO), the flow returns to the step S40 so as to reproduce the next piece of music.

As described above, according to the third embodiment, since it is detected whether or not an error is included in the sub code data by referring to any of the data constructing the detected sub code data, it is possible to prevent the CD player from performing any undesirable operation such as an erroneous display operation based on the erroneously detected sub code data.

Modified Embodiments

In the above explained first to third embodiment, the case where a plurality of CD players 101a and 101b are controlled by the controller 30 which is located at the external of the CD players 101a and 101b, has been explained. However, the present invention is not limited to this construction. The present invention can be applied to such a case that an error is generated in the clock due to a noise when the clock is transmitted between the control data decoding portion 12 and the system control microcomputer 14 of FIG. 1 which are equipped in a single housing.

As described above in detail, according to the present embodiments, even if the first data portion of the sub code data is erroneously changed in the middle of reproduction of the music due to the noise mixed into the clock, it is judged whether or not the value indicated by the second data portion of the sub code data is equal to the value which is supposed to be obtained when the first data portion of the sub code data is normally changed at the end of the reproduction of each piece of main data without any error. Then, it can be judged that the reproduction of the main data is in the middle even if the first data portion erroneously indicates that it is the end. Thus, it becomes possible to prevent the CD player from erroneously stopping the reproduction in the middle of one piece of the music even if the noise is mixed into the clock for the detecting the sub code data.

Further, if the first data portion of the sub code data is normally changed at the end of reproduction of one main data, the value of the second data portion of the sub code data equal to the predetermined value which is supposed to be obtained when the first data portion of one main data is normally changed at the end of reproduction of the main data without error, is detected. Thus, according to the result of this detection, it can be judged that the reproduction of the main data is finished.

In this manner, even if the first data portion of the sub code data is erroneously or abnormally changed due to the noise, it is still possible to detect the end of the reproduction of the main data correctly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of detecting an end of a reproduction of each piece of main data recorded on an information record medium, on which each piece of sub code data corresponding to said each piece of main data is also recorded to indicate information for controlling the reproduction of said each piece of main data, in a reproducing system which reads said main data and said sub code data on the basis of a predetermined clock, said sub code data including a first data portion, which value changes when the reproduction of said each piece of main data is ended, and a second data portion, which value changes in correspondence with a content of said main data and has a predetermined relationship with a value of the first data portion, said method comprising the steps of:

- detecting a change in the value of the first data portion during the reproduction of said each piece of main data;
- detecting a current value of the second data portion when the change is detected by the change detecting step;
- judging whether or not the detected current value of the second data portion is equal to a predetermined value of the second data portion, which is supposed to be obtained when the first data portion is normally changed at the end of the reproduction of said each piece of main data; and
- detecting the end of the reproduction of said each piece of main data on the basis of a result of judgement by the judging step.

2. A method according to claim 1, wherein said first data portion comprises track number data which indicate a serial number of pieces of main data within the information record medium, and said second data portion comprises index data which indicate a position within said each piece of main data.

3. A method according to claim 1, wherein said each piece of main data comprises a piece of music, said first data portion comprises a music number data which indicate a serial music number within the information record medium, and said second data portion comprises index data which indicate a position within each piece of music.

4. A method according to claim 1, wherein said each piece of main data comprises a movement of one piece of music, said first data portion comprises a movement number data which indicate a serial movement number of said one piece of music, and said second data portion comprises an index data which indicate a position within each movement.

5. A method according to claim 1, further comprising the step of storing the first data portion when the end of the reproduction of said each piece of main data is detected by the end detecting step,
wherein the stored first data portion is compared with a current value of the first data portion in the change detecting step to detect the change.

6. A method according to claim 5, further comprising the steps of:
- detecting whether or not the reproduced piece of main data is at a final position of said information record medium before the change detecting step, and
- finishing the reproduction if the reproduced piece of main data is detected to be at the final position.

7. An apparatus for detecting an end of a reproduction of each piece of main data recorded on an information record medium, on which each piece of sub code data corresponding to said each piece of main data is also recorded to indicate information for controlling the reproduction of said each piece of main data, in a reproducing system which reads said main data and said sub code data on the basis of a predetermined clock, said sub code data including a first data portion, which value changes when the reproduction of said each piece of main data is ended, and a second data portion, which value changes in correspondence with a content of said main data and has a predetermined relationship with a value of the first data portion, said apparatus comprising:
- a change detection means for detecting a change in the value of the first data portion during the reproduction of said each piece of main data;
- a current value detection means for detecting a current value of the second data portion when the change is detected by said change detection means;
- a judgement means for judging whether or not the detected current value of the second data portion is equal to a predetermined value of the second data portion, which is supposed to be obtained when the first data portion is normally changed at the end of the reproduction of said each piece of main data; and
- an end detection means for detecting the end of the reproduction of said each piece of main data on the basis of a result of judgement by the judgement means.

8. An apparatus according to claim 7, wherein said first data portion comprises track number data which indicate a serial number of pieces of main data within the information record medium, and said second data portion comprises index data which indicate a position within said each piece of main data.

9. An apparatus according to claim 7, wherein said each piece of main data comprises a piece of music, said first data portion comprises a music number data which indicate a serial music number within the information record medium, and said second data portion comprises index data which indicate a position within each piece of music.

10. An apparatus according to claim 7, wherein said each piece of main data comprises a movement of one piece of music, said first data portion comprises a movement number data which indicate a serial movement number of said one piece of music, and said second data portion comprises an index data which indicate a position within each movement.

11. An apparatus according to claim 7 further comprising a storage means for storing the first data portion when the end of the reproduction of said each piece of main data is detected by said end detection means,
wherein the stored first data portion is compared with a current value of the first data portion by said change detection means to detect the change.

12. An apparatus according to claim 11, wherein said end detection means further detects whether or not the reproduced piece of main data is at a final position of said information record medium, said reproducing system finishing the reproduction if the reproduced piece of main data is detected to be at the final position by said end detection means.

13. A system for reproducing each piece of main data recorded on an information record medium, on which each piece of sub code data corresponding to said each piece of main data is also recorded to indicate information for controlling the reproduction of said each piece of main data, said sub code data including a first data portion, which value changes when the reproduction of said each piece of main data is ended, and a second data portion, which value changes in correspondence with a content of said main data and has a predetermined relationship with a value of the first data portion, said system comprising:
- a read means for reading said main data and said sub code data on a basis of a predetermined clock;
- a change detection means for detecting a change in the value of the first data portion during the reproduction of said each piece of main data;
- a current value detection means for detecting a current value of the second data portion when the change is detected by said change detection means;
- a judgement means for Judging whether or not the detected current value of the second data portion is equal to a predetermined value of the second data portion, which is supposed to be obtained when the first data portion is normally changed at the end of the reproduction of said each piece of main data; and an end detection means for detecting an end of a reproduction of said each piece of main data on the basis of a result of judgement by the judgement means, said system reproducing said each piece of main data in accordance with the end of the reproduction detected by said end detection means.

14. A system according to claim 13 further comprising a storage means for storing the first data portion when the end of the reproduction of said each piece of main data is detected by said end detection means, wherein the stored first data portion is compared with a current value of the first data portion by said change detection means to detect the change.

15. A system according to claim 14, wherein said end detection means further detects whether or not the reproduced piece of main data is at a final position of said information record medium, said system finishing the reproduction if the reproduced piece of main data is detected to be at the final position by said end detection means.

16. A system according to claim 13, wherein said read means comprises a plurality of CD players, and said system further comprises a switch means for switching outputs of said plurality of CD players to selectively output one of the outputs to said change detection means and the current value detection means.

17. A system according to claim 13, wherein, if the current value of the second data portion is not judged to be equal to the predetermined value by said judgement means, the sub code data currently read by said read means is neglected so that said system keeps reproducing said each piece of main data in accordance with the sub code data previously read by said read means.

18. A system according to claim 13, wherein said system is adapted to perform a random reproduction, a repeated reproduction and a programmed reproduction of said each piece of main data on the basis of the end of the reproduction detected by said end detection means.

* * * * *